(12) United States Patent
Trucko et al.

(10) Patent No.: US 11,898,103 B2
(45) Date of Patent: Feb. 13, 2024

(54) SYSTEMS AND PROCESS FOR CONTROLLING A SULFUR EXTRACTION FROM A HYDROCARBON STREAM

(71) Applicant: UOP LLC, Des Plaines, IL (US)

(72) Inventors: Jessy E. Trucko, Lake Forest, IL (US); Yili Shi, Buffalo Grove, IL (US); Keith Lehuta, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/820,275

(22) Filed: Aug. 17, 2022

(65) Prior Publication Data
US 2023/0138459 A1     May 4, 2023

Related U.S. Application Data

(60) Provisional application No. 63/263,256, filed on Oct. 29, 2021.

(51) Int. Cl.
*C10G 21/30* (2006.01)
*C10G 27/04* (2006.01)
(Continued)

(52) U.S. Cl.
CPC ............ *C10G 21/30* (2013.01); *C10G 27/04* (2013.01); *C10G 53/14* (2013.01); *G05B 15/02* (2013.01); *C10G 2300/202* (2013.01)

(58) Field of Classification Search
CPC ........ C10G 21/30; C10G 27/04; C10G 53/14; C10G 2300/202; G05B 15/02
See application file for complete search history.

(56) References Cited

U.S. PATENT DOCUMENTS

| 4,666,689 A | 5/1987 | Maple et al. |
| 5,997,731 A | 12/1999 | Suarez |

(Continued)

FOREIGN PATENT DOCUMENTS

| CA | 2592926 A1 | 1/2009 |
| CA | 2826715 A1 | 3/2015 |

(Continued)

OTHER PUBLICATIONS

Rita, A.I. et al., Comparison of different strategies to treat challenging refinery spent caustic effluents, Separation and Purification Technology 253 (2020) 117482.

(Continued)

*Primary Examiner* — Prem C Singh
*Assistant Examiner* — Brandi M Doyle

(57) ABSTRACT

Systems and processes for removing sulfur compounds from a hydrocarbon stream. Sulfur compounds are extracted from a hydrocarbon feed stream with a caustic stream to provide a treated hydrocarbon stream and a rich caustic stream. The sulfur compounds in the rich caustic stream are oxidized in the presence of a catalyst to provide a lean caustic stream. The lean caustic stream is returned to extract sulfur from the hydrocarbon stream. Data such as a concentration of sulfurs species and degree of caustic saturation with the sulfur species in the rich caustic stream may be provided by a sensor, compared against other real-time or historical data and used to provide a recommended adjustment to process conditions associated with an extraction unit, or an oxidation unit, or both.

12 Claims, 1 Drawing Sheet

(51) Int. Cl.
*G05B 15/02* (2006.01)
*C10G 53/14* (2006.01)

(56) References Cited

U.S. PATENT DOCUMENTS

| | | | |
|---|---|---|---|
| 7,604,724 | B2 | 10/2009 | Mortson |
| 2011/0226670 | A1 | 9/2011 | Cullen |
| 2013/0277236 | A1 | 10/2013 | Hein et al. |
| 2015/0068984 | A1 | 3/2015 | Milosevic et al. |
| 2018/0155640 | A1 | 6/2018 | Dalal et al. |
| 2018/0229179 | A1 | 8/2018 | Gansley |
| 2019/0003978 | A1 | 1/2019 | Shi et al. |
| 2020/0222851 | A1* | 7/2020 | De Ren .................. C10G 53/12 |
| 2020/0291320 | A1 | 9/2020 | Hu et al. |

FOREIGN PATENT DOCUMENTS

| | | |
|---|---|---|
| CA | 2863051 A1 | 3/2015 |
| CA | 3106732 A1 | 1/2020 |
| CN | 108918781 A | 11/2018 |
| CN | 109593583 A | 4/2019 |
| CN | 109647159 A | 4/2019 |
| CN | 110681248 A | 1/2020 |
| CN | 112110622 A | 12/2020 |
| JP | 20200181453 A | 11/2020 |
| KR | 20190130558 A | 11/2019 |
| WO | 03014264 A1 | 2/2003 |

OTHER PUBLICATIONS

Martinie, Gary D. et al., Investigation of Alternative Processes for Refinery Spent Caustic Treatment, http://onepetro.org/WPCONGRESS/proceedings-pdf/WPC16/All-WPC16/WPC-30233/1914714/wpc-30233.pdf/1.

Shupu, Li et al., Analysis of technical revamping of mercaptan removal plant for FCC LPG, Petroleum Refinery Engineering, Nov. 2018. (Abstract Only).

Chakraborty, Soma et al., Effective Removal of Sour Gases Containing Mercaptans in Oilfield Applications, 2017, Society of Petroleum Engineers.

International Search Report from corresponding PCT application No. PCT/US2022/078575, dated Feb. 22, 2023.

Written Opinion from corresponding PCT application No. PCT/US2022/078575, completed Feb. 21, 2023.

* cited by examiner

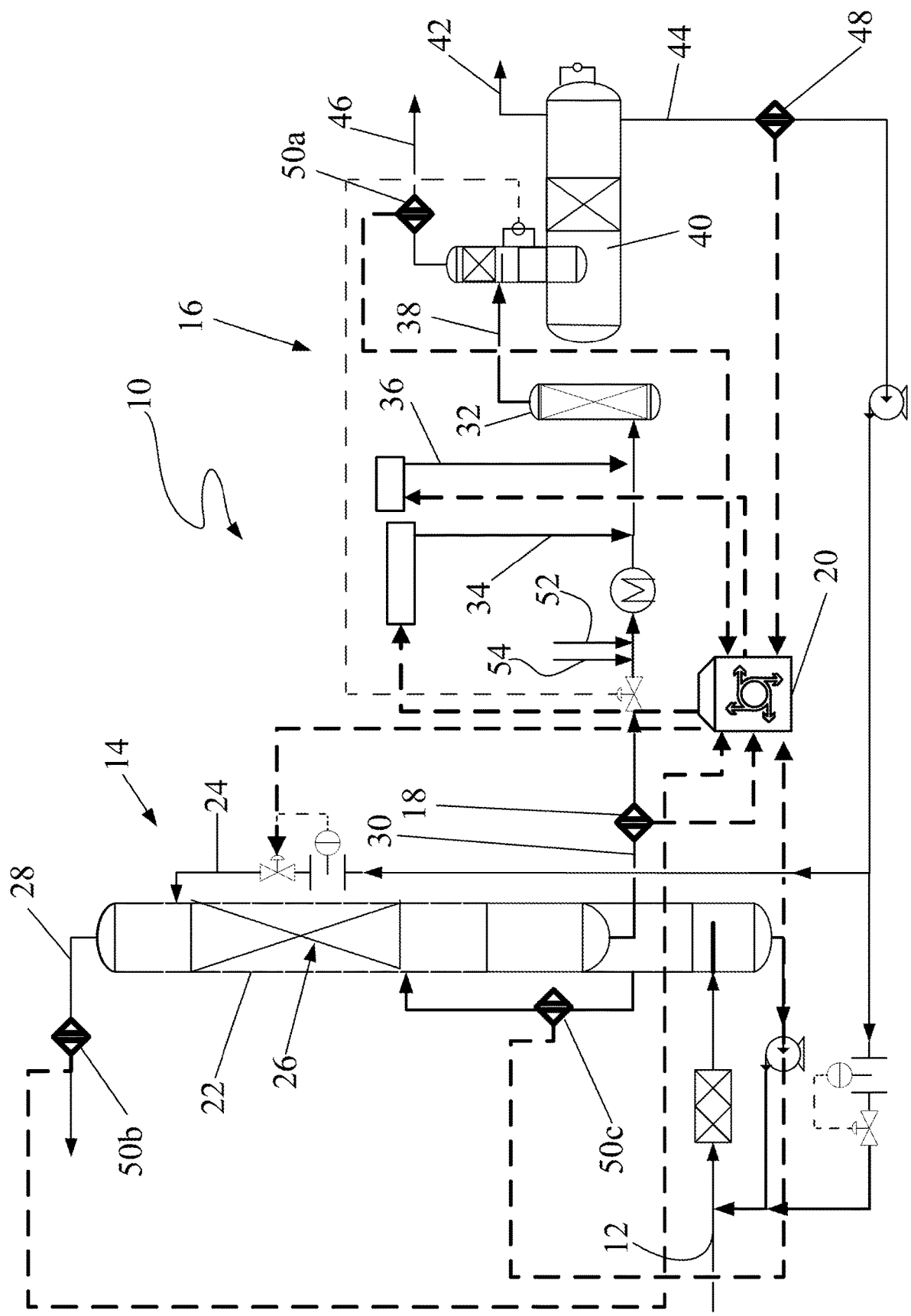

SYSTEMS AND PROCESS FOR CONTROLLING A SULFUR EXTRACTION FROM A HYDROCARBON STREAM

RELATED APPLICATIONS

This application claims priority to U.S. Patent Application Ser. No. 63/263,256 filed on Oct. 29, 2021, the entirety of which is incorporated herein by reference.

FIELD OF THE INVENTION

This invention relates generally to processes for removing sulfur from hydrocarbons, and more particularly to controlling the process conditions based on one more obtained data points from a sulfur removal process.

BACKGROUND OF THE INVENTION

Petroleum refining and petrochemical processes frequently involve treating processes which remove sulfur compounds from hydrocarbon streams. In these processes, mercaptans or hydrogen sulfide present in gas or liquid hydrocarbon streams such as natural gas, naphtha, or liquid petroleum gas are extracted into an aqueous alkaline solution to form a caustic stream rich in mercaptide or sulfide species. The extracted hydrogen sulfide may be oxidized to form the analogous thiosulfate or sulfate salt. The extracted mercaptans in the rich caustic stream may be oxidized to form disulfide compounds. The disulfides separate from the caustic, providing a lean caustic stream that is recycled to extract sulfur from the hydrocarbon stream.

The concentration of mercaptides in caustic is an important piece of data to monitor the operations of the unit, determine if adjustments need to be made, or to prevent upsets. Current processes obtain information associated with the lean caustic stream. Some current analytical method uses off-line laboratory analysis to measure the value. This analysis, however, is difficult to run and it may be done too infrequently. There is also a manual test that can be done at the unit, but the results are very qualitative. Further, it has been proposed to use an electrode system, which has limitations and only applies to mercaptides.

Therefore, there remains a need for an effective and efficient process for obtaining information regarding the caustic stream in a sulfur extraction process.

SUMMARY OF THE INVENTION

One or more processes for removing sulfur from hydrocarbons have been invented in which information is obtained about the rich caustic stream that may be used to adjust processing conditions for the sulfur removal process. The information obtained is compared against a second information that may be stored or may also be obtained from the system. Based on the comparison, one or more adjustments may be recommended and/or implemented to ensure that the system is operating effectively and efficiently. By obtaining information about the rich caustic stream, the present processes are able to more accurately determine potential adjustments compared with the processes which focus on the lean caustic stream. Specifically, it is thought that the rich caustic stream data will be less susceptible to interference from contaminants or other factors that might impact the interpretation of the data.

The present invention may, therefore, be characterized, in at least one aspect, as providing a process for removing sulfur compounds from a hydrocarbon stream by: extracting sulfur compounds with a caustic stream from a hydrocarbon feed stream to provide a treated hydrocarbon stream and a rich caustic stream; obtaining a data regarding the rich caustic stream; oxidizing the sulfur compounds in the rich caustic stream in the presence of a catalyst to provide a lean caustic stream; comparing the data regarding the rich caustic stream to a second data; and, based on the comparing, recommending at least one change to an operating condition associated with the process for removing sulfur compounds from the hydrocarbon stream.

The process may also include implementing the at least one change to the operating condition.

The process may further include obtaining a data regarding the lean caustic stream, wherein the second data comprises the data regarding the lean caustic stream.

It is contemplated that the data regarding the rich caustic stream comprises a concentration of sulfurs species and degree of caustic saturation with the sulfur species in the rich caustic stream.

It is further contemplated that the second data comprises a concentration of sulfurs species and degree of caustic saturation with the sulfur species in the lean caustic stream.

The process may include obtaining a supplemental data regarding one or more process conditions associated with the process for removing sulfur compounds from the hydrocarbon stream and that recommending the at least one change to the operating condition associated with the process may be further based on the supplemental data. The supplemental data may be data relating to a spent air, or data relating to the hydrocarbon feed stream, or data relating to the treated hydrocarbon stream, or any combination thereof.

The at least one change to the operating condition associated with the process may be an adjustment of an amount of caustic mixed with the hydrocarbon feed stream, or an adjustment of an amount of catalyst added to the rich caustic stream, or an adjustment to an amount of oxidant mixed with the rich caustic stream, or an adjustment to an amount of fresh caustic added to the process, or an adjustment to an amount of water added to the process, or an adjustment to an operating temperature of an oxidation unit, or any combination thereof.

The present invention may also be generally characterized in at least one aspect as providing a process for controlling removal of sulfur compounds from a hydrocarbon stream with a caustic stream to provide a treated hydrocarbon stream and a rich caustic stream by: obtaining a data regarding the rich caustic stream; oxidizing the sulfur compounds in the rich caustic stream in the presence of a catalyst to provide a lean caustic stream; obtaining a data regarding the lean caustic stream; comparing the data regarding the rich caustic stream to the data regarding the lean caustic stream; and, based on the comparing, recommending at least one change to an operating condition associated with the process for controlling removal of sulfur compounds from a hydrocarbon stream.

The at least one change to the operating condition associated with the process may be an adjustment of an amount of caustic mixed with the hydrocarbon feed stream, or an adjustment of an amount of catalyst added to the rich caustic stream, or an adjustment to an amount of oxidant mixed with the rich caustic stream, or an adjustment to an amount of fresh caustic added to the process for controlling removal of sulfur compounds from a hydrocarbon stream, or an adjustment to an amount of water added to the process for controlling removal of sulfur compounds from a hydrocarbon stream, or an adjustment to an operating temperature of an oxidation unit, or any combination thereof.

The data regarding the rich caustic stream may be a concentration of sulfurs species and degree of caustic saturation with the sulfur species in the rich caustic stream. The data regarding the lean caustic stream may be a concentration of sulfurs species and degree of caustic saturation with the sulfur species in the lean caustic stream.

The process may include obtaining a supplemental data regarding one or more process conditions for the process for controlling removal of sulfur compounds from a hydrocarbon stream and that recommending the at least one change to the operating condition associated with the process may be further based on the supplemental data. The supplemental data may be data relating to a spent air, or data relating to the hydrocarbon feed stream, or data relating to the treated hydrocarbon stream, or any combination thereof.

In some aspects the present invention may be characterized, broadly has providing a system for removing sulfur compounds from a hydrocarbon stream. The system may include: an extraction unit configured to receive a hydrocarbon stream comprising sulfur compounds and a caustic stream and to provide a treated hydrocarbon stream and a rich caustic stream; an oxidation unit configured to receive the rich caustic stream, a catalyst, and a stream of oxidant, and to provide a lean caustic stream; a sensor configured to obtain a data regarding the rich caustic stream; and, a controller in communication with the sensor, the controller configured to compare the data regarding the rich caustic stream to a second data and, based on the comparison, recommend at least one change to an operating condition associated with the extraction unit, or the oxidation unit, or both.

The system may further include a second sensor, the second sensor configured to obtain a data regarding the lean caustic stream. The controller may be in communication with the second sensor, and the data regarding the lean caustic stream.

The data regarding the rich caustic stream may be a concentration of sulfurs species and degree of caustic saturation with the sulfur species in the rich caustic stream, or the data regarding the lean caustic stream may be a concentration of sulfurs species and degree of caustic saturation with the sulfur species in the lean caustic stream, or both.

The system may further include an additional sensor configured to obtain a supplemental data regarding one or more conditions associated with the extraction unit, or the oxidation unit, or both. The controller may be in communication with the additional sensor, and may be configured to recommend the at least one change further based on the supplemental data.

The at least one change may be an adjustment of an amount of caustic mixed with the hydrocarbon feed stream, or an adjustment of an amount of catalyst added to the rich caustic stream, or an adjustment to an amount of oxidant mixed with the rich caustic stream, or an adjustment to an amount of fresh caustic added to the extraction unit, or the oxidation unit, or both, or an adjustment to an amount of water added to the extraction unit, or the oxidation unit, or both, or an adjustment to an operating temperature of the extraction unit, or the oxidation unit, or both, or any combination thereof.

The controller may be remotely located from a location of the extraction unit and the oxidation unit.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which:

FIG. 1 shows a schematic process flow diagram of a system used for a sulfur removal from a hydrocarbon stream.

DETAILED DESCRIPTION OF THE INVENTION

As mentioned above, the present invention utilizes information obtained about the rich caustic stream in a sulfur removal process to determine one or more changes or adjustments to an operating condition associated with the sulfur removal process conditions. With these general principles in mind, one or more embodiments of the present invention will be described with the understanding that the following description is not intended to be limiting.

As shown in FIG. 1, a system 10 for removing sulfur compounds from a hydrocarbon stream 12 includes an extraction unit 14, an oxidation unit 16, a sensor 18, and a controller 20 in communication with the sensor 18.

The extraction unit 14 comprises a vessel 22 that receives the hydrocarbon stream 12 to be treated to remove sulfur compounds contained in the hydrocarbon stream 12. Example sources of the hydrocarbon stream 12 include natural gas fractionation facilities, a crude fractionation tower, a coker, an FCC unit, and the like. The vessel 22 of the extraction unit 14 also receives a caustic stream 24.

In an extraction section 26 of the vessel 22, the caustic flows counter current (downward as shown in FIG. 1) to the direction of flow of the hydrocarbons (upward as shown in FIG. 1). As a result of the contact between the two, sulfur compounds are extracted from the hydrocarbons into the caustic. The extraction may also be achieved with other contacting devices, mixer settlers, or a thin film extraction to name a few.

A treated hydrocarbon stream 28 may be recovered from the extraction section 26 of the vessel 22. Compared with the hydrocarbon stream 12, the treated hydrocarbon stream 28 has a lower amount of sulfur compounds.

A rich caustic stream 30 is also recovered from the extraction section 26 of the vessel 22. Compared with the caustic stream 24, the rich caustic stream 30 has a higher amount of sulfur compounds. To remove the sulfur compounds from the rich caustic stream 30, the rich caustic stream 30 is passed to the oxidation unit 16.

The oxidation unit 16 includes at least one vessel 32 that receives rich caustic stream 30. The vessel 32 also receives a stream of catalyst 34 and a stream of oxidant 36 which may be an oxygen containing gas or a liquid oxidant, like hydrogen peroxide, or a combination thereof. As depicted, these additional streams 34, 36 are combined with the rich caustic stream 30 and passed as a single stream into the vessel 32. Within the vessel 32, the captured sulfur compounds are oxidized by oxygen, in the presence of the catalyst, and form disulfides.

An oxidized caustic stream 38 from the vessel 32 may be passed to a second vessel 40 which allows for separation of the oxidized caustic stream 38 into three phases, including a gaseous phase and two liquid phases. A first liquid phase 42 comprises the disulfides which may be removed and processed as is known. The second liquid phase comprises the caustic which may be recovered from the second vessel 40 as a lean caustic stream 44. The gaseous phase, a spent air stream 46, may also be recovered from the second vessel 40. A degassing section may be utilized in the vessel 32 as disclosed in U.S. Pat. Pub. No. 2014/0235897.

As noted above, while prior proposed systems analyzed the lean caustic stream 44, the present processes analyze the rich caustic stream 30. Accordingly, the sensor 18 is arranged in a line that contains the rich caustic stream 30. The sensor 18 may be and/or utilize a spectrophotometer, optical camera, titration, an electrochemical potential meter, like an ORP sensor, UV Vis, liquid chromatography, including HPLC, chemiluminescence detector, or oxidation and extraction with gas chromatograph. Generally, all of the sensors 18 are used to measure a characteristic of the rich caustic stream 30 indicative of a mercaptide concentration.

For example, a spectrophotometer, optical camera, liquid chromatography, or HPLC may be used to detect a change in catalyst color based on the amount of mercaptides. Similarly, titration could be done on the rich caustic stream 30 and the spectrophotometer, optical camera, liquid chromatography, or HPLC may be used to detect a change in color which may be correlated to an amount of mercaptides.

Similarly, oxidizing a sample of the rich caustic stream 30 and extracting with a clean hydrocarbon could be analyzed by various gas chromatograph methods which could indicate wppm sulfur in the sample. This could be used to calculate a wppm sulfur in the rich caustic stream 30.

Additionally, an electrochemical potential meter sensor may be utilized as the sensor 18 to obtain information concerning the degree of saturation of the sulfur species in the rich caustic stream 30 based on an electrochemical potential of the stream 30. This could indicate if there is hydrogen sulfide entering the extraction unit 14.

Signals, measurements, and/or data generated or recorded by the sensor 18 are transmitted to the controller 20, which may be local to the system 10 or it may be remotely located. The controller 20 is a computing devices or systems that includes at least one processor and memory storing computer-readable instructions that, when executed by the at least one processor, cause the one or more computing devices to perform a process that may include one or more steps. The controller 20 is a computing device may be, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The controller 20 may be configured to receive, from the sensor 18, data and may be configured to analyze the data. Based on analyzing the data, the controller 20 may be configured to determine one or more recommended adjustments to one or more parameters of one or more processes described herein. The controller 20 may be configured to transmit encrypted or unencrypted data that includes the one or more recommended adjustments to the one or more parameters of the one or more processes described herein.

More specifically, the controller 20 compares the obtained data from the sensor 18 against a second data. The second data may include real time data, stored data, or a combination thereof. For example, a database of past data may be maintained in memory associated with the controller 20.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by the controller or a computing device.

The past data may be from the sensor 18, or it may be from another source of data. For example, the second data may be obtained via a second sensor 48 which is configured to obtain data regarding the lean caustic stream 44. The second sensor 48 may be the same type or kind as the first sensor 18. For example, both the first and the second sensor 18, 48 may be electrochemical potential meters or sensors. However, it is also contemplated that the sensor second 48 is a different kind or type from the first sensor 18.

Based on the comparison between the obtained data (from the first sensor 18) and the second data, the controller 20 is configured to recommend at least one change to an operating condition associated with the extraction unit 14, or the oxidation unit 16, or both.

The recommendation may also be based on supplemental data regarding one or more process conditions. For example, the supplemental data may be data relating to the spent air 46, or data relating to the hydrocarbon feed stream 12, or data relating to the treated hydrocarbon stream 28, or a combination thereof. The supplemental data may be obtained with a supplemental sensor 50a, 50b, 50c.

For data relating to the spent air, the supplemental sensor 50a may be configured to indicate an amount of oxygen the spent air 46. Accordingly, the supplemental sensor 50a may be in a line for the spent air 46 and may be a paramagnetic, gas chromatograph, or tunable laser diode. It should be appreciated that any sensor discussed herein could be in slip stream from the process line. For data relating to the feed or treated hydrocarbon streams 12, 28, the supplemental sensor 50b, 50c may be configured to indicate an amount of individual sulfur species and/or total sulfur in the hydrocarbon stream 12, 28. Accordingly, the supplemental sensor 50b, may be in a line for the treated hydrocarbon stream 28 and may be a gas chromatograph, chemiluminescence, or XRF. Additionally, and alternatively, the supplemental sensor 50c, may be in a line containing hydrocarbon feed stream 12 and may be a gas chromatograph, chemiluminescence, or XRF.

Possible changes or adjustments that may be recommended and/or implemented include: an adjustment of an amount of the caustic stream 24 mixed with the hydrocarbon feed stream 12; an adjustment of an amount of catalyst 34 added to the rich caustic stream 30; an adjustment to an amount of oxidant 36 mixed with the rich caustic stream 30; an adjustment to an amount of fresh caustic 52 added to the process; an adjustment to an amount of water 54 added to the process; an adjustment to an operating temperature of the oxidation unit 16; and combinations thereof.

EXAMPLES

The first sensor 18 may be an electrochemical potential meter that provides data on the concentration of sulfurous species and the degree of caustic saturation with such species of the rich caustic stream 30 by providing, for example, an electrochemical potential value. The second data may be a database of correlated electrochemical potential values and sulfurous species content in the rich caustic stream 30. Depending on the comparison an adjustment may include changing the caustic circulation rate, changing the air injection rate to the oxidation unit 16, changing the feed blend to the extraction unit, or changing the feed rate to the extraction unit 14.

Additionally, or alternatively, the second data may be from the second sensor 48 which is also an electrochemical potential meter sensor in the lean caustic line 44. The comparison of the two could be used to determine if/when the mercaptide in the lean caustic is trending higher. If the level exceeds a threshold, a recommended adjustment could be increasing the amount of catalyst 34 added in the oxidation unit 16. The same data may also indicate the mercaptan extraction efficiency of the lean caustic 44 in response to which a recommended adjustment may be to increase an amount of fresh caustic 52 and/or water 54 added to the system 10.

It is still further contemplated that the recommended adjustment is based on the supplemental sensor 50a being configured to indicate an amount of oxygen in the spent air 46. If the amount is above a certain threshold, for example, 10%, or 12% or 15%, the adjustment may include increasing the amount of catalyst 34 or decreasing the amount of oxidant 36 mixed with the rich caustic stream 30.

Furthermore, supplemental sensors 50b, 50c on the feed and treated hydrocarbon streams 12, 28 could be used, in conjunction with the data from the first sensor 18, to identify baseline sulfur content values and ensure sufficient removal.

Additionally, the controller 20 may be configured to send signals to one or more pieces of equipment such as a control valve, heater, timer, pump, or other similar device in order to implement the recommended change. The controller 20 may also send more than one recommendation—allowing one to be implemented or more than one to be implemented.

In any configuration, compared to conventional processes and systems, the use of the sensor 18 on the rich caustic stream 30 to obtain data that is compared against second data is believed to provide a more accurate information that can be used to adjust process conditions more efficiently and effectively.

The methods and steps described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods of changing the configuration of the thrusters described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for removing sulfur compounds from a hydrocarbon stream, the process comprising extracting sulfur compounds with a caustic stream from a hydrocarbon feed stream to provide a treated hydrocarbon stream and a rich caustic stream; obtaining a data regarding the rich caustic stream; oxidizing the sulfur compounds in the rich caustic stream in the presence of a catalyst to provide a lean caustic stream; comparing the data regarding the rich caustic stream to a second data; and, based on the comparing, recommending at least one change to an operating condition associated with the process for removing sulfur compounds from the hydrocarbon stream. An embodiment of the invention is one, any or all of prior embodiments in this paragraph up through the first embodiment in this paragraph, further comprising implementing the at least one change to the operating condition. An embodiment of the invention is one, any or all of prior embodiments in this paragraph up through the first embodiment in this paragraph, further comprising obtaining a data regarding the lean caustic stream, wherein the second data comprises the data regarding the lean caustic stream. An embodiment of the invention is one, any or all of prior embodiments in this paragraph up through the first embodiment in this paragraph, wherein the data regarding the rich caustic stream comprises a concentration of sulfurs species and degree of caustic saturation with the sulfur species in the rich caustic stream. An embodiment of the invention is one, any or all of prior embodiments in this paragraph up through the first embodiment in this paragraph, wherein the second data comprises a concentration of sulfurs species and degree of caustic saturation with the sulfur species in the lean caustic stream. An embodiment of the invention is one, any or all of prior embodiments in this paragraph up through the first embodiment in this paragraph, further comprising obtaining a supplemental data regarding one or more process conditions associated with the process for removing sulfur compounds from the hydrocarbon stream, wherein recommending the at least one change to the operating condition associated with the process is further based on the supplemental data. An embodiment of the invention is one, any or all of prior embodiments in this paragraph up through the first embodiment in this paragraph, wherein the supplemental data comprises data relating to a spent air, or data relating to the hydrocarbon feed stream, or data relating to the treated hydrocarbon stream, or any combination thereof. An embodiment of the invention is one, any or all of prior embodiments in this paragraph up through the first embodiment in this paragraph, wherein the at least one change to the operating condition associated with the process comprises an adjustment of an amount of caustic mixed with the hydrocarbon feed stream, or an adjustment of an amount of catalyst added to the rich caustic stream, or an adjustment to an amount of oxidant mixed with the rich caustic stream, or an adjustment to an amount of fresh caustic added to the process, or an adjustment to an amount of water added to the process, or an adjustment to an operating temperature of an oxidation unit, or any combination thereof.

A second embodiment of the invention is a process for controlling removal of sulfur compounds from a hydrocarbon stream with a caustic stream to provide a treated hydrocarbon stream and a rich caustic stream, the process comprising obtaining a data regarding the rich caustic stream; oxidizing the sulfur compounds in the rich caustic stream in the presence of a catalyst to provide a lean caustic stream; obtaining a data regarding the lean caustic stream; comparing the data regarding the rich caustic stream to the data regarding the lean caustic stream; and, based on the comparing, recommending at least one change to an operating condition associated with the process for controlling removal of sulfur compounds from a hydrocarbon stream. An embodiment of the invention is one, any or all of prior embodiments in this paragraph up through the second embodiment in this paragraph, wherein the at least one change to the operating condition associated with the process comprises an adjustment of an amount of caustic mixed with the hydrocarbon feed stream, or an adjustment of an amount of catalyst added to the rich caustic stream, or an adjustment to an amount of oxidant mixed with the rich caustic stream, or an adjustment to an amount of fresh caustic added to the process for controlling removal of sulfur compounds from a hydrocarbon stream, or an adjustment to an amount of water added to the process for controlling removal of sulfur compounds from a hydrocarbon stream, or an adjustment to an operating temperature of an oxidation unit, or any combination thereof. An embodiment of the invention is one, any or all of prior embodiments in this paragraph up through the second embodiment in this paragraph, wherein the data regarding the rich caustic stream comprises a concentration of sulfurs species and degree of caustic saturation with the sulfur species in the rich caustic stream. An embodiment of the invention is one, any or all of prior embodiments in this paragraph up through the second embodiment in this paragraph, wherein the data regarding the lean caustic stream comprises a concentration of sulfurs species and degree of caustic saturation with the sulfur species in the lean caustic stream. An embodiment of the invention is one, any or all of prior embodiments in this paragraph up through the second embodiment in this paragraph, further comprising obtaining a supplemental data regarding one or more process conditions for the process for controlling removal of sulfur compounds from a hydrocarbon stream, wherein recommending the at least one change to the operating condition associated with the process is further based on the supplemental data. An embodiment of the invention is one, any or all of prior embodiments in this paragraph up through the second embodiment in this paragraph, wherein the supplemental data comprises data relating to a spent air, or data relating to the hydrocarbon feed stream, or data relating to the treated hydrocarbon stream, or any combination thereof.

A third embodiment of the invention is a system for removing sulfur compounds from a hydrocarbon stream, the system comprising an extraction unit configured to receive a hydrocarbon stream comprising sulfur compounds and a caustic stream and to provide a treated hydrocarbon stream and a rich caustic stream; an oxidation unit configured to receive the rich caustic stream, a catalyst, and an oxidant, and to provide a lean caustic stream; a sensor configured to obtain a data regarding the rich caustic stream; and, a controller in communication with the sensor, the controller configured to compare the data regarding the rich caustic stream to a second data and, based on the comparison, recommend at least one change to an operating condition associated with the extraction unit, or the oxidation unit, or both. An embodiment of the invention is one, any or all of prior embodiments in this paragraph up through the third embodiment in this paragraph, further comprising a second sensor, the second sensor configured to obtain a data regarding the lean caustic stream, and wherein the controller is in communication with the second sensor, and wherein the data regarding the lean caustic stream comprises the second data. An embodiment of the invention is one, any or all of prior embodiments in this paragraph up through the third embodiment in this paragraph, wherein the data regarding the rich caustic stream comprises a concentration of sulfurs species and degree of caustic saturation with the sulfur species in the rich caustic stream, or wherein the second data comprises a concentration of sulfurs species and degree of caustic saturation with the sulfur species in the lean caustic stream, or both. An embodiment of the invention is one, any or all of prior embodiments in this paragraph up through the third embodiment in this paragraph, further comprising an additional sensor configured to obtain a supplemental data regarding one or more conditions associated with the extraction unit, or the oxidation unit, or both, wherein the controller is in communication with the additional sensor, and wherein the controller is configured to recommend the at least one change further based on the supplemental data. An embodiment of the invention is one, any or all of prior embodiments in this paragraph up through the third embodiment in this paragraph, wherein the at least one change comprises an adjustment of an amount of caustic mixed with the hydrocarbon feed stream, or an adjustment of an amount of catalyst added to the rich caustic stream, or an adjustment to an amount of oxidant mixed with the rich caustic stream, or an adjustment to an amount of fresh caustic added to the extraction unit, or the oxidation unit, or both, or an adjustment to an amount of water added to the extraction unit, or the oxidation unit, or both, or an adjustment to an operating temperature of the extraction unit, or the oxidation unit, or both, or any combination thereof. An embodiment of the invention is one, any or all of prior embodiments in this paragraph up through the third embodiment in this paragraph, wherein the controller is remotely located from a location of the extraction unit and the oxidation unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for removing sulfur compounds from a hydrocarbon stream, the process comprising:
   extracting sulfur compounds with a caustic stream from a hydrocarbon feed stream to provide a treated hydrocarbon stream and a rich caustic stream;
   obtaining a data, regarding the rich caustic stream, comprising a concentration of sulfurs species and degree of caustic saturation with the sulfur species in the rich caustic stream;
   oxidizing the sulfur compounds in the rich caustic stream in a presence of a catalyst to provide a lean caustic stream;
   comparing the data regarding the rich caustic stream to a second data; and,
   based on the comparing, recommending at least one change to an operating condition associated with the process for removing sulfur compounds from the hydrocarbon stream.

2. The process of claim 1, further comprising:
   implementing the at least one change to the operating condition.

3. The process of claim 1, further comprising:
   obtaining a data regarding the lean caustic stream, wherein the second data comprises the data regarding the lean caustic stream.

4. The process of claim 1, wherein the second data comprises a concentration of sulfurs species and degree of caustic saturation with the sulfur species in the lean caustic stream.

5. The process of claim 1, further comprising:
   obtaining a supplemental data regarding one or more process conditions associated with the process for removing sulfur compounds from the hydrocarbon stream,
   wherein recommending the at least one change to the operating condition associated with the process is further based on the supplemental data.

6. The process of claim 5, wherein the supplemental data comprises:
   data relating to a spent air, or
   data relating to the hydrocarbon feed stream, or
   data relating to the treated hydrocarbon stream, or
   any combination thereof.

7. The process of claim 1, wherein the at least one change to the operating condition associated with the process comprises:
   an adjustment of an amount of caustic mixed with the hydrocarbon feed stream,
   or an adjustment of an amount of catalyst added to the rich caustic stream, or
   an adjustment to an amount of oxidant mixed with the rich caustic stream, or
   an adjustment to an amount of fresh caustic added to the process, or
   an adjustment to an amount of water added to the process, or
   an adjustment to an operating temperature of an oxidation unit, or
   any combination thereof.

8. A process for controlling removal of sulfur compounds from a hydrocarbon stream with a caustic stream to provide a treated hydrocarbon stream and a rich caustic stream, the process comprising:
   obtaining a data, regarding the rich caustic stream, comprising a concentration of sulfurs species and degree of caustic saturation with the sulfur species in the rich caustic stream;
   oxidizing the sulfur compounds in the rich caustic stream in a presence of a catalyst to provide a lean caustic stream;
   obtaining a data regarding the lean caustic stream;
   comparing the data regarding the rich caustic stream to the data regarding the lean caustic stream; and,
   based on the comparing, recommending at least one change to an operating condition associated with the process for controlling removal of sulfur compounds from a hydrocarbon stream.

9. The process of claim 8, wherein the at least one change to the operating condition associated with the process comprises:
   an adjustment of an amount of caustic mixed with the hydrocarbon stream, or an
   adjustment of an amount of catalyst added to the rich caustic stream, or
   an adjustment to an amount of oxidant mixed with the rich caustic stream, or an adjustment to an amount of fresh caustic added to the process for controlling removal of sulfur compounds from a hydrocarbon stream, or an adjustment to an amount of water added to the process for controlling removal of sulfur compounds from a hydrocarbon stream, or an adjustment to an operating temperature of an oxidation unit, or any combination thereof.

10. The process of claim 9, wherein the data regarding the lean caustic stream comprises a concentration of sulfurs species and degree of caustic saturation with the sulfur species in the lean caustic stream.

11. The process of claim 8, further comprising:

obtaining a supplemental data regarding one or more process conditions for the process for controlling removal of sulfur compounds from a hydrocarbon stream, wherein recommending the at least one change to the operating condition associated with the process is further based on the supplemental data.

12. The process of claim 11, wherein the supplemental data comprises:

data relating to a spent air, or data relating to the hydrocarbon stream, or data relating to the treated hydrocarbon stream, or any combination thereof.

\* \* \* \* \*